United States Patent [19]
Whiteside

[11] 4,312,498
[45] Jan. 26, 1982

[54] FIXTURE FOR CUTTING TUBE TURNS

[76] Inventor: Wayland B. Whiteside, Rte. 1, Box 206, Center, Tex. 75935

[21] Appl. No.: 108,407

[22] Filed: Dec. 31, 1979

[51] Int. Cl.³ .............................................. B23K 7/04
[52] U.S. Cl. ...................................... 266/56; 266/71; 266/77; 269/41
[58] Field of Search ...................... 269/41; 266/54, 55, 266/56, 57, 58, 61, 70, 71, 77

[56] References Cited

U.S. PATENT DOCUMENTS

| | | | |
|---|---|---|---|
| 2,464,444 | 3/1949 | Gantz | 266/56 |
| 2,698,748 | 1/1955 | Evans | 266/61 |
| 2,805,057 | 9/1957 | Bain | 266/57 |
| 2,848,215 | 8/1958 | Pendergrass | 266/56 |
| 3,206,180 | 9/1965 | Grubish | 266/57 |
| 3,900,346 | 8/1975 | Muller | 266/54 |

Primary Examiner—L. Dewayne Rutledge
Assistant Examiner—John P. Sheehan
Attorney, Agent, or Firm—Bernard A. Reiter

[57] ABSTRACT

A fixture for selectively positioning a tube turn for acetylene torch cutting thereof to a desired included angle includes means for supporting a tube turn of particular dimension and for selectively positioning the tube turn relative to a vertical or horizontal plane of reference and for selectively positioning the tube turn at a particular angle with reference to the selected plane of reference. Means is also provided for orienting a cutting torch for accomplishment of a circular cut through the tube turn, said cut being made in a plane positioned substantially normal to an axis defined by the support structure. The support structure defines an annular tube orienting surface that is adapted to establish annular surface contact with the outer curved surface portion of the tube turn. This supporting surface is defined by lines of intersection of a cylinder with the outer surface of a tube turn that is oriented with the center line of the cylinder in intersecting relation with the arcuate center line of the tube turn. The supporting surface maintains the entire annular periphery thereof in orienting contacts with the outer curved surface portion of the tube turn.

18 Claims, 3 Drawing Figures

U.S. Patent  Jan. 26, 1982  4,312,498
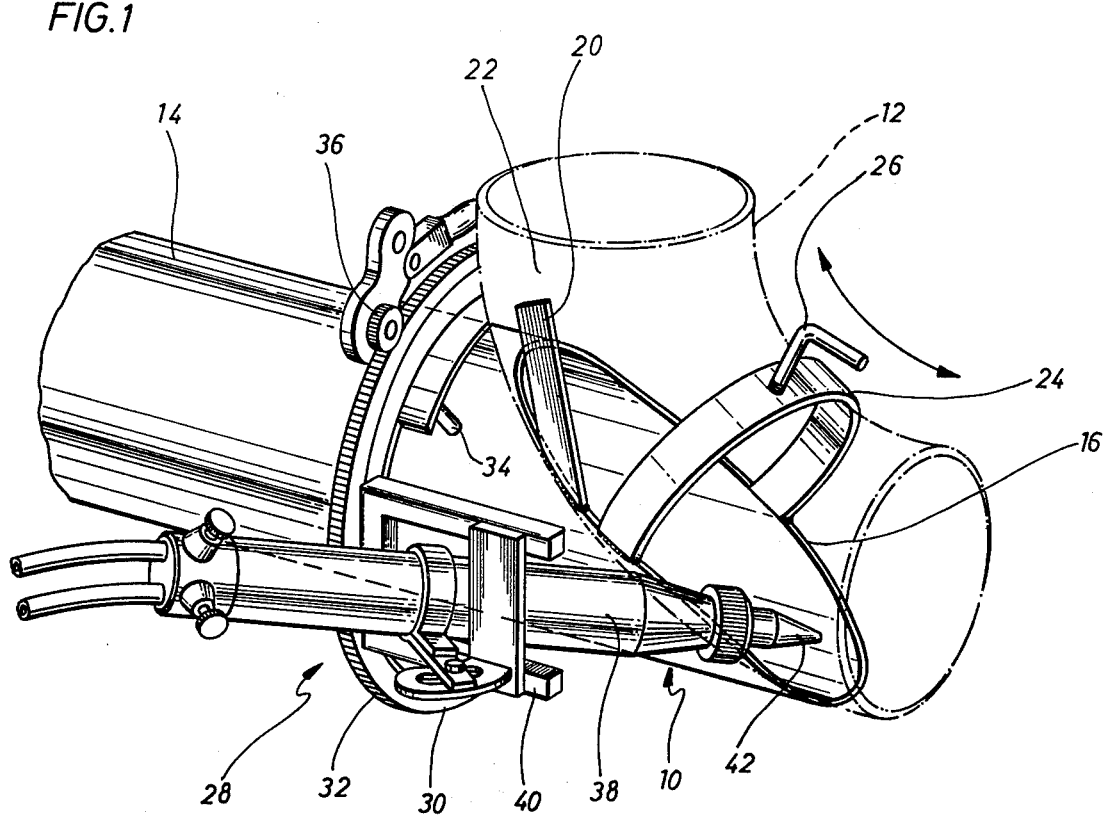
FIG.1
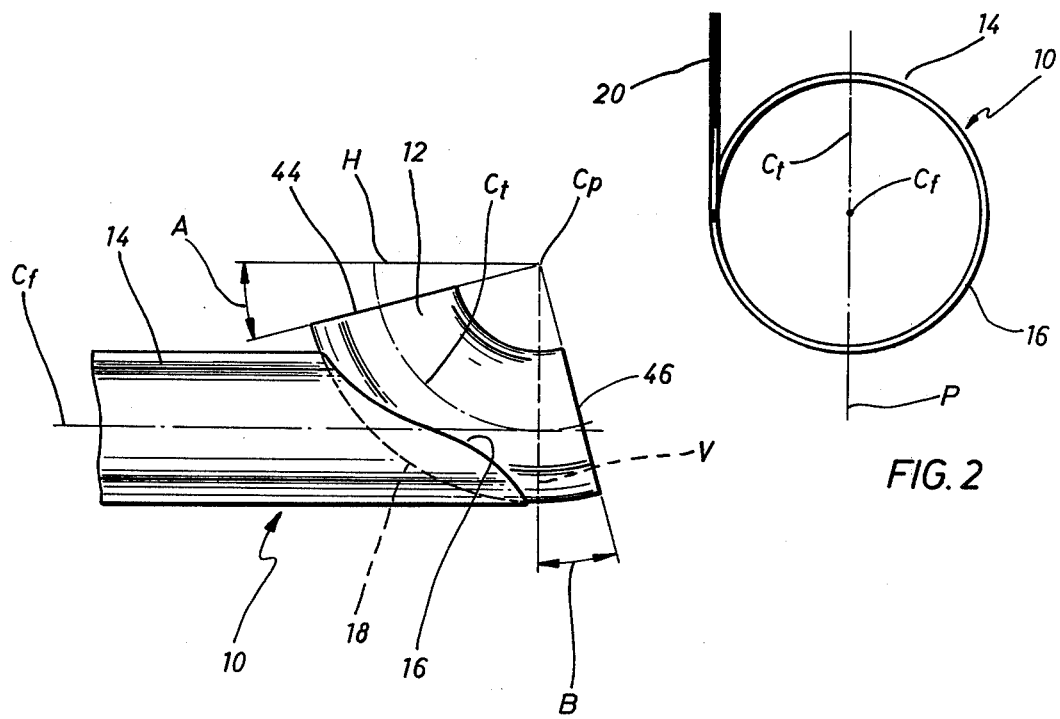
FIG.2
FIG.3

FIXTURE FOR CUTTING TUBE TURNS

FIELD OF THE INVENTION

This invention relates generally to tube turns that are typically provided for establishing interconnection between intersecting sections of straight pipe, and, more particularly, the present invention is directed to apparatus for cutting tube turns to any desired angle of less than 90° and preparing the cut end of the tube turn for welded connection to a pipe section.

BACKGROUND OF THE INVENTION

In construction operations where sections of intersecting pipe are to be interconnected by welding, it is typical in the industry to employ a curved pipe section which is typically referred to as a "tube turn." Tube turns are typically manufactured with bends of 90° and 45°, thereby allowing connection of pipes that intersect in normal relation to one another, and also facilitate interconnection of pipes that intersect at an included angle of 135°. In many cases, however, it is desirable that straight pipe sections intersect at included angles of other than 90° or 135°, and, in such case, it is necessary for workmen to cut the tube turn such that the included angle thereof is as desired. Since tube turns are formed to define a circular cross-sectional configuration throughout the length thereof and are formed to define a smoothly curved partially circular segment that is generated about a point of concentricity, the workmen must calculate the angular modification of the 45° or 90° tube turn in order to cut the tube turn along a line radiating from the point of concentricity of the tube turn. Since apparatus is typically unavailable in the field for calculating angular modification of the tube turn in this manner, a typical field solution for accomplishing the desired result is for workmen to place the tube turn in assembly with one of the pipes to which it is to be connected. The other pipe is then oriented in appropriate angular relation relative to the tube turn, and with the center line of the pipe in intersecting relation with the curved center line of the tube turn. A straight-edge is then laid along the intersecting pipe in parallel relation with the axis of the pipe and is brought into contact with the tube turn and this point of contact is marked. Numerous other points of contact will be established in similar manner and the result will be the layout of a cut line that will be properly oriented in relation to the end of the intersecting pipe. Obviously, this layout procedure is difficult and time consuming to accomplish in the field and requires that the workmen involved be highly skilled in order to layout and cut the tube turn in proper manner for connection thereof to the interconnecting pipe. Moreover, the cut that is made on the tube turn must be beveled such that the resulting tube turn end is properly beveled in order that registry thereof with the end of the intersecting pipe will define a properly formed weld groove for receiving the weld metal as the tube turn is joined to the intersecting pipe by welding. Even under circumstances where layout and cutting of tube turns is accomplished by experienced workmen, the time required for the layout and cutting operation can be extensive, i.e. in the order of two hours or more. The labor requirement for this operation, therefore, obviously detracts from the commercial feasibility of the construction operation that is being accomplished. It is desirable, therefore, to provide means for accomplishing simple and efficient layout of cutting operations for tube turns, so as to provide properly cut tube turns through involvement of minimum labor and expense. In view of the foregoing, therefore, it is a primary feature of this invention to provide a novel fixture for selectively positioning a tube turn for cutting of the tube turn to a desired included angle and without requiring any layout work for accomplishing the positioning and cutting operation.

It is another feature of this invention to provide a novel fixture for selectively positioning a tube turn and wherein typical pipe cutting apparatus may be employed in conjunction with the tube turn in order to establish a precision cut, thereby ensuring proper beveling of the edge of the tube turn and proper precision cutting of the tube turn to a precise included angle.

It is an even further feature of this invention to provide a novel fixture for cutting of tube turns, wherein a tube turn may be positioned relative to the fixture, locked in assembly with the fixture, whereby the tube turn may be oriented in any suitable position relative to the fixture.

It is another object of this invention to provide a novel fixture for selectively positioning a tube turn for cutting thereof, wherein angular measurement of the cut to be made on the tube turn may be established by means of a simple level, such as is typically available in the field during pipe construction operations.

Other and further objects, advantages and features of this invention will become obvious to one skilled in the art upon an understanding of the illustrative embodiment about to be described and various advantages, not referred to herein, will occur to one skilled in the art upon employment of the invention in practice.

SUMMARY OF THE INVENTION

The present invention is directed to the provision of a fixture for selectively positioning a tube turn in order that the tube turn may be cut from its original 45° or 90° included angle to a desired smaller included angle. A support structure is defined which may conveniently take the form of a length of pipe which is formed at one extremity thereof to define an annular supporting surface that is adapted to be engaged by the outer curved surface area of a tube turn. This supporting surface is defined such as by the intersection of an imaginary cylinder with the outer surface of a tube turn oriented with the center line of the cylinder in intersecting relation with the arcuate center line of the tube turn. The annular tube turn orienting surface, with a tube turn positioned in properly seated relation thereon, has the entire peripheral surface thereof in contact with the outer curved surface of the tube turn. The fixture device incorporates a guide member that is maintained in contact with the tube turn to further ensure proper seated relation of the tube turn in assembly with the fixture. The fixture also incorporates a locking mechanism that enables the tube turn to be firmly secured in assembly with the fixture in order that the position thereof relative to the fixture may be positively maintained during the cutting operation. A conventional pipe cutter, such as a rotary oxyacetylene pipe cutter, for example, may be employed to accomplish the cut after the tube turn has been properly positioned relative to the fixture.

BRIEF DESCRIPTION OF THE DRAWINGS

In order that the manner in which the above-recited advantages, objects and features of this invention are attained and can be understood in detail, more particular description of the invention, briefly summarized above, may be had by reference to the specific embodiment thereof that is illustrated in the appended drawings, which drawings form a part of this specification. It is to be understood, however, that the appended drawings illustrate only a typical embodiment of this invention and therefore are not to be considered limiting of its scope, for the invention may admit to other equally effective embodiments.

IN THE DRAWINGS

FIG. 1 is an isometric illustration of a tube turn positioning and cutting fixture constructed in accordance with the present invention, showing a pipe cutting mechanism interconnected with the fixture and showing in broken line a 90° tube turn positioned within the fixture.

FIG. 2 is an end view of the tube turn positioning and cutting fixture of FIG. 1.

FIG. 3 is a side view of the tube turn positioning and cutting fixture of FIG. 1, showing a tube turn positioned in assembly therewith and further showing in graphical form the method of positioning the tube turn in order to establish proper cutting of the tube turn to the desired included angle.

DETAILED DESCRIPTION OF PREFERRED EMBODIMENT

Referring now to the drawings and first to FIG. 1, there is illustrated a fixture generally at 10 for selectively positioning a tube turn, shown in broken line at 12, in order that the tube turn may be simply and efficiently positioned for cutting thereof to a desired included angle. Although the fixture 10 may take any number of suitable forms, in the drawings the fixture is shown to be defined by a pipe section 14 having a tube turn positioning and support surface 16 defined at one extremity thereof. The tube turn positioning and support surface 16 is formed in particular relation with the tube turn to be positioned in assembly therewith and is of generally elliptical configuration as shown in the figures although not forming a perfect ellipse as is evident from the side view of FIG. 3. The pipe section 14 is of cylindrical configuration and the surface 16 is defined by the intersecting relationship of the pipe section 14 with the outer curved surface portion 18 of a tube turn that is properly oriented with respect to the fixture. This proper position is illustrated in FIGS. 1 and 3. This proper position may be referred to in conjunction with FIG. 2 as the position wherein a plane P within which the curved center line Ct lies, intersects or is tangent to the centr line Cf of the fixture 10.

In order to establish proper positioning of a tube turn in assembly with the fixture 10, it is desirable to provide a guide element that will ensure that the positioning and support surface 16 of the fixture will be properly engaged by the outer bend surface 18 of the tube turn. An external guide element 20 extends from one side of the fixture 10 adjacent the positioning and support surface 16 and is positioned so as to establish a parallel relationship with the plane P when the tube turn 12 is properly positioned in relation to the positioning and support surface 16. To establish proper positioning therefor, the tube turn is simply brought into contact with the positioning and support surface 16 and is rotated relative to the positioning and support surface until a side surface portion 22 of the tube turn is positioned so as to establish line contact with the straight guide element 20. In this properly oriented position, therefore, the annular positioning and support surface 16 of the fixture 10 is in full annular surface contact with the outer curved surface portion 18 of the tube turn.

It is also desirable to establish a retained or secured relationship between the fixture and a tube turn that is properly positioned thereon in order that the fixture may be rotated, if desired, during the tube cutting operation. In order to accomplish this feature, a retainer band 24 of partially circular configuration is interconnected at each extremity thereof to the pipe section 14 at the immediate vicinity of opposed side portions of the positioning and support surface 16. A locking element, such as a screw 26, is received by the retainer band 24 and may be manually manipulated to bear against a tube turn and secure the tube turn in properly oriented assembly with the positioning and support surface 16. With the locking element 26 secured, the fixture 10 with a tube turn assembled therewith, may be rotated, thus causing rotation of the tube turn, if such is desired, during a cutting operation.

To achieve cutting of the tube turn, a conventional pipe cutter may be employed, such as illustrated generally at 28 in FIG. 1. The pipe cutter will typically employ a gear ring 30 having gear teeth 32 defining the outer periphery thereof. The gear ring 30 is secured with respect to the pipe section of the fixture 10 by means of a plurality of adjustment standoff elements 34 that ensure that the gear ring is maintained in concentric relation with respect to the center line Cf of the fixture. An appropriate drive mechanism, incorporating a drive gear 36, is operative to impart rotation to the rotary gear ring 30. An oxyacetylene cutting torch 38 is secured with respect to the gear ring 30 by means of a support frame 40, thus ensuring that the tip 42 of the cutting torch remains in properly oriented relation with the outer surface of the tube turn during 360° rotation of the cutting torch 38. The cutting tip 42 is maintained in angularly oriented relation with the tube turn so as to provide a beveled cut, thus preparing the tube turn for welded interconnection to a section of straight pipe.

As shown diagrammatically in FIG. 3, positioning and cutting of a 90° tube turn is accomplished first by positioning the tube turn with an end surface 44 thereof positioned such that the plane defined thereby is in parallel relation with the center line Cf of the fixture and with the curved center line Ct of the tube turn in intersecting relation with the center line Cf of the fixture. This position is established simply by placing a welder's level across the end surface 44 of the tube turn and by positioning the tube turn such that the position of the end portion 44 of the tube turn is level. Thereafter, the tube turn is then rotated along the curved center line Ct thereof about the point of curvature Cp about which the curved center line Ct is generated. The angular relation between the horizontal line H and the plane established by the end surface portion 44 of the tube turn, identified as angle A, determines the angular portion B of the tube turn that is to be cut away. The cut is then made in normal relation to the center line Cf of the fixture 10, along a plane in normal relation to the center line Cf. The cut is therefore also made in normal relation to the horizontal line H, thus makinga circular cut about the tube turn 12 with the circular cut lying in a plane V which is in normal relation both with the center line Cf and with the horizontal line H. Regardless of whether a tube turn of 45° or 90° is to be cut, the tube turn is positioned with one of the end surfaces thereof in registry with the horizontal or vertical reference lines H or V. The tube turn is then rotated relative to the reference lines H or V until the welder's level indicates that the proper angular relationship of the end surfaces 44 or 46 has been established with respect to the selected reference line. When this has been accomplished, the locking element 26 is manipulated such that the tube turn is secured with respect to the positioning and support surface 16 and the orienting element 20. Thereafter, the cutting device 28 may be operated in such manner as to achieve a cut along line V, thus cutting an angular portion of the tube turn away and leaving a remaining portion having a proper include angle for proper welded connection to the intended pipe sections. The circlar cut may be made by a pipe cutting apparatus that rotates with respect to the fixture 10 or, in the alternative, the fixture 10 may be rotated relative to a cutting device with a tube turn interconnected therewith and secured by means of the retainer band 24 and the locking element 26. By rotation of the tube turn in this manner, a circular cut will be made on the tube turn and an angular portion thereof will be cut away, leaving a remaining angular portion of appropriate included angle.

The positioning and support surface 16 may be generated on a tubular pipe section as shown at 14 in the figures or, in the alternative, the positioning and support surface 16 may be defined by any other support structure within the spirit and scope of this invention. It is only necessary that the positioning and support surface 16 be properly formed such that the entire surface portion thereof is positioned in engaging relation with the outer bend portion 18 of a tube turn, such that the tube turn will be properly oriented in order that a precisely circulat cut may be made along a line radiating from the center point Cp about which the curvature of the tube turn is generated. By employing a fixture device as shown at 10, precision orientation and cutting of tube turns may be accomplished simply and efficiently under adverse conditions such as typically exist in the field. Considerable savings in time and effort will occur through utilization of fixtures constructed in accordance with this invention.

In view of the foregoing, it is respectfully submitted that the present invention is clearly capable of achieving each of the objects and features hereinabove set forth together with other objects and features that are inherent in the structure of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof. It is to be understood that all matters hereinabove set forth or shown in the accompanying drawings are to be interpreted as illustrative and not in any limiting sense.

What is claimed is:

1. A fixture for selectively positioning a tube turn having a curved outer surface and defining an arcuate center-line and a point of curvature, said fixture positioning said tube turn for cutting of said tube turn to a desired included angle, said fixture comprising:
   a support structure defining generally elliptical tube orienting surface means adapted to establish generally eliptical surface contact with the outer curved surface portion of said tube turn, said tube orienting surface being defined by intersection of an imaginary cylinder with the curved outer surface of a tube turn oriented with the center-line of said cylinder in intersecting relation with the arcuate center-line of said tube turn, said tube orienting surface having substantially continuous pheripheral surface contact with said outer curved surface portion of said tube turn.

2. A fixture as recited in claim 1, wherein: said tube orienting surface maintains said generally ellipitical surface contact with said outer curved surface of said tube turn during rotational positioning movement of said tube turn about the point of curvature thereof and in a plane within which said point of curvature and arcuate center-line of said tube turn both lie.

3. A fixture as recited in claim 1, wherein: said tube orienting surface is of the same diameter as the cross-sectional diameter of said tube turn.

4. A fixture as recited in claim 1, including:
   guide means extending from said support structure and adapted for engagement with at least one side surface of said tube turn to orient said tube turn in proper relation with said support structure.

5. A fixture as recited in claim 4, wherein:
   said guide means lies in a plane lying substantially parallel with the center line of said cylinder.

6. A fixture as recited in claim 1, wherein:
   a transverse plane extending in substantially normal relation with said cylinder coincides with a circular cross-section of a tube turn positioned with the outer curved surface thereof in supported engagement with said support structure.

7. A fixture as recited in claim 1, wherein:
   securing means is provided on said support structure, said securing means retains said support structure in immovable assembly with a tube turn engaging said tube orienting surface means.

8. A fixture as recited in claim 7, wherein said securing means comprises:
   a retainer band extending from said support structure and adapted to at least partially encircle a tube turn; and locking means being provided on said retainer band and being capable of establishing locking engagement with said tube turn to retain the tube turn in releasably locked assembly with said support structure.

9. A fixture as recited in claim 1, wherein:
   pipe cutting means is connected in assembly with said support structure and is adapted to cut said tube turn along a transverse plane extending in normal relation with said imaginary cylinder.

10. A fixture as recited in claim 1, wherein:
    said support structure is defined by a section of straight pipe of the same cross-sectional dimension as the cross-sectional dimension of the tube turn to be positioned for cutting; and
    said supporting surface being defined at one extremity of said pipe.

11. A fixture as recited in claim 10, including:
    a retainer structure being interconnected with said support structure; and means locking said retainer structure and said support structure in immovable assembly with said tube turn.

12. A fixture as recited in claim 10, including:
a retainer band being interconnected with said support structure and adapted to encircle at least a part of a tube turn in assembly with said support structure;
a locking element being interconnected with said retainer band and establishing locking engagement with a tube turn to retain the tube turn in assembly with said support structure; and
a guide element interconnected with said support structure and adapted to engage a tube turn to establish proper positioning of said tube turn relative to said support structure.

13. A fixture in claim 12, including:
pipe cutter means having a rotational relationship with said support structure, and adapted to make a circular cut through a tube turn positioned by said support structure, said circular cut being made in substantially normal relation with said section of straight pipe and in a selected relation with said support structure whereby selective positioning of said tube turn relative to said support structure selectively determines the resulting angular dimension of said tube turn.

14. Apparatus for selectively positioning a tube turn defining a curved outer bend surface and a curved center-line and for cutting of said tube turn to a selected angular dimension, and apparatus comprising:
a straight cylindrical support structure defining tube turn orienting surface means at one extremity thereof, said cylindrical support structure being of the same cross-sectional dimension as the cross-sectional dimension of the tube turn to be cut, said tube turn orienting surface means being defined by the intersecting relation of said cylindrical support structure with the outer bend surface of a tube turn having the curved center-line thereof lying in a first plane including the center-line of said cylindrical support structure;
means for securing a tube turn in substantially immovable assembly with said tube turn orienting surface means; and
means for making a circular cut through said tube turn at the intersection of a second plane with said tube turn, wherein said second plane is normal to said center-line of said cylindrical support structure and intersects said tube turn to describe a circle on said second plane.

15. Apparatus as recited in claim 14, including:
guide means extending from said cylindrical support structure and adapted for guiding engagement with at least one side surface of said tube turn to properly position said tube turn relative to said tube turn orienting surface.

16. Apparatus as recited in claim 15, including:
securing means is provided on said support structure, said securing mans retains said support structure in immovable assembly with a tube turn engaging said tube orienting surface means.

17. Apparatus as recited in claim 15, including:
a retainer band extending from said support structure and adapted to at least partially encircle a tube turn; and
locking means being provided on said retainer band and being capable of establishing locking engagement with said tube turn to retain the tube turn in releasably locked assembly with said support structure.

18. Apparatus as recited in claim 15, wherein said means for making a circular cut through said tube turn comprises:
a rotatable torch support structure being securable to said cylindrical support structure; and
an oxyacetylene cutting torch being supported by said torch support structure and being rotatable about said cylindrical support structure for cutting said tube turn.

* * * * *